UNITED STATES PATENT OFFICE 2,466,011

NITRODIPHENYLAMINE COMPOUNDS CONTAINING A DI-SUBSTITUTED SULFAMYL GROUP

Joseph B. Dickey, Rochester, N. Y., and James G. McNally, Kingsport, Tenn., assignors to Eastman Kodak Company, Rochester, N. Y., a corporation of New Jersey No Drawing. Application November 7, 1946, Serial No. 708,460

1 Claim. (Cl. 260—397.7)

This invention relates to bicyclic compounds containing a diphenylamine nucleus and more particularly to such compounds attached to the same benzene nucleus of which there is only one nitro group, said nitro group being in the ortho position to the diphenylamine nitrogen atom, and a di-substituted sulfamyl group in para position to the diphenylamine nitrogen atom.

Compounds containing a diphenylamine nucleus in which there are two nitro groups attached to the same benzene nucleus, the nitro groups being in the ortho positions to the diphenylamine nitrogen atom and containing on the same benzene nucleus a phenyl substituted sulfamyl group in the para position to the diphenylamine nitrogen atom have been described by Ullmann in Annalen, vol. 366, page 107 (1909). These prior diphenylamine compounds, we have found, will dye textile materials comprising organic derivatives of cellulose, such as cellulose acetate. However, the dyeing speed is very low and the dyed textile material is not resistant to fading in light.

We have now found new diphenylamine compounds which have the general formula:

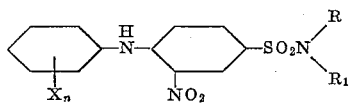

wherein R and $R_1$ each represents a member selected from the group consisting of a low carbon alkyl group, a low carbon hydroxyalkyl group, a low carbon alkoxyalkyl group, a low carbon monohydroxyalkoxyalkyl group, a low carbon monosulfoalkyl group, a low carbon monosulfatoalkyl group and the allyl group, X represents a member selected from the group consisting of a low carbon alkyl group, a low carbon alkoxy group, a hydroxy group, a halogen atom, a low carbon alkacylamino group and a low carbon hydroxyalkoxy group, and $n$ stands for a member selected from the group consisting of 0, 1, 2 and 3. Our new compounds contrary to the action of the prior compounds dye organic derivatives of cellulose textile materials, such as cellulose acetate textile materials, at a relatively rapid rate and are relatively very stable to light.

It is accordingly an object of our invention to provide new diphenylamine compounds. A further object is to provide a process for preparing such compounds. A still further object is to provide materials, especially organic derivatives of cellulose textile materials, dyed with such new compounds. Other objects will become apparent hereinafter.

In accordance with our invention we prepare our new diphenylamine compounds by condensing, in the presence of an acid-binding agent, a monocyclic primary aromatic amine of the benzene series having the general formula:

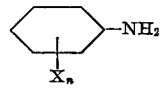

wherein X and $n$ have the meaning previously assigned to them with a monocyclic benzene compound having the formula:

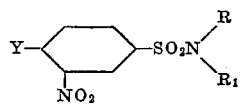

where R and $R_1$ have the meaning previously assigned to them and Y stands for a halogen atom.

Exemplary of the monocyclic primary aromatic amines of the benzene series are aniline, o-toluidine, m-toluidine, p-toluidine, o-anisidine, m-anisidine, p-anisidine, o-phenetidine, m-phenetidene, p-phenetidine, 2-ethylaniline, 3-ethylaniline, 4-ethylaniline, 2,3-dimethylaniline, 2,4-dimethylaniline, 2,5-dimethylaniline, 2,4,5-trimethylaniline, 4-n-propylaniline, 4-sec.-butylaniline, 4-n-butylaniline, p-β-hydroxyethoxyaniline, o-β-hydroxypropoxyaniline, p-β-γ-dihydroxypropoxyaniline, o-chloroaniline, m-chloroaniline, p-chloroaniline, o-bromoaniline, m-bromoaniline, p-bromoaniline, o-fluoroaniline, p-fluoroaniline, o-iodoaniline, m-iodoaniline, p-iodoaniline, o-aminophenol, m-aminophenol, p-aminophenol, 2,4-dihydroxyaniline, 2,5-dihydroxyaniline, 2,4-dichloroaniline, 2,5-dichloroaniline, 3,4-dichloroaniline, 2,4-dibromoaniline, 2,4-difluoroaniline, 4-acetaminoaniline, 2-hydroxy-4-acetaminoaniline, 2,4,6-tribromoaniline, 2,3,4-trichloroaniline, 2,4,6-trichloroaniline, 4-acetamino-2-ethoxyaniline, 4-n-propionylaminoaniline, 4-n- butyrylaminoaniline, 2,5-dimethoxyaniline, 2,5-diethoxyaniline and cumidine.

The expression "low carbon" when used with reference to an alkyl group, a hydroxyalkyl group, a monosulfoalkyl group, a monosulfatoalkyl group, an alkoxy group, a hydroxyalkoxy group or an alkacylamino group means that the group contains no more than four carbon atoms. When used with reference to an alkoxyalkyl group or a monohydroxyalkoxyalkyl group, it has reference to a group containing 3 to 6 carbon atoms, inclusive. Normally, the alkyl group, the hydroxyalkyl group, the monosulfoalkyl group, the monosulfatoalkyl group, the alkoxy group, the hydroxyalkoxy group, the alkoxyalkyl group or the hydroxyalkoxyalkyl group will be a primary group and will contain less than the maximum number of carbon atoms permissible. Similarly, the alkacyl portion of the alkacylamino group is normally a primary group containing less than the maximum number of carbon atoms permissible.

Illustrative alkyl, hydroxyalkyl, monosulfoalkyl and monosulfatoalkyl groups include, for example, the methyl group, the ethyl group, the n-propyl group, the n-butyl group, the β-hydroxyethyl group, the β-hydroxypropyl group, the β,γ-dihydroxypropyl group, the γ-hydroxypropyl group, the β-methyl-β,γ-dihydroxypropyl group, the δ-hydroxybutyl group, the β-sulfoethyl group, the β-sulfopropyl group, the γ-sulfopropyl group, the δ-sulfobutyl group, the β-sulfatoethyl group, the β-sulfatopropyl group, the γ-sulfatopropyl group and the δ-sulfatobutyl group.

Illustrative alkoxy and hydroxyalkoxy groups include, for example, the methoxy group, the ethoxy group, the n-propoxy group, the n-butoxy group, the β-hydroxyethoxy group, the β,γ-dihydroxypropoxy group and the δ-hydroxybutoxy (—O—CH₂CH₂CH₂CH₂OH) group. Illustrative alkacylamino groups include the acetamino group, the n-propionylamino and the n-butyrylamino group. Similarly, illustrative alkoxyalkyl and monohydroxyalkoxyalkyl groups include, for example, the β-methoxyethyl group, the β-ethoxyethyl group, the γ-methoxypropyl, the β-n-butoxyethyl group, the β-(β-ethoxyethoxy)-ethyl (—CH₂CH₂—O—CH₂CH₂—OC₂H₅) group, the β-(β-methoxyethoxy)-ethyl group, the β-(β-hydroxyethoxy)-ethyl group, the β-[β-(β-hydroxyethoxy)ethoxy]-ethyl group, the β-(β-hydroxypropoxy)-propyl group and the γ-(γ-hydroxypropoxy)-propyl group.

As monocyclic compounds containing a halogen atom, a nitro group and a di-substituted sulfamyl group the more readily available chlorine compounds are advantageously employed. As acid-binding agents the alkali metal carbonates, the alkali metal bicarbonates, the alkaline earth carbonates, the alkaline earth bicarbonates and tertiary amines, for example, can be employed.

Advantageously the monocyclic aromatic primary amine is employed in excess (about 1.1 mole for each mole of halogen-containing nitrobenzenesulfonamide compound). The excess amine can be removed after the condensation by steam distillation, or where the amine is not readily steam distillable, it can be dissolved in dilute acid, e. g. 1 to 5 per cent aqueous hydrochloric or sulfuric acid, and the dye filtered from the resulting solution. Where the amine is neither steam distillable nor soluble in dilute acids, the dye is advantageously separated from the excess amine by extraction with a suitable solvent. Our new dyes are all yellow in color, except as otherwise indicated.

The following examples will serve to illustrate our new dyes and the manner of obtaining the same.

*Example 1.—2-nitro-4-(N,N-dimethylsulfamyl)-diphenylamine*

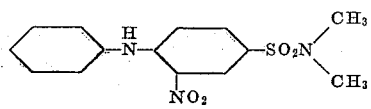

In a flask, fitted with a mechanical stirrer, were placed 116.6 grams (1.1 moles) of sodium carbonate and 102.3 grams (1.1 moles) of aniline. The stirrer was started and the mixture in the flask heated to 125° C. To the hot mixture were added portionwise 264 grams (1 mole) of N,N-dimethyl-4-chloro-3-nitrobenzenesulfonamide (also called 4-chloro-3-nitrobenzenesulfondimethylamide) so that the reaction does not become too vigorous. After the addition, heating was continued for 6 hours at 125° C. to 135° C. The reaction mixture was permitted to cool and then was steam distilled to remove unreacted aniline. The yellow dye remaining with the aqueous still liquors was filtered off, washed well with water and dried in the air. It melted at 128° C. to 131° C.

*Example 2.—2-nitro-4-(N-methyl-N-β-hydroxyethylsulfamyl) diphenylamine*

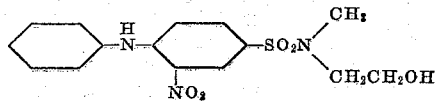

5.9 grams of N-methyl-N-β-hydroxyethyl-4-chloro-3-nitrobenzenesulfonamide, 2.23 grams of aniline and 2 grams of sodium bicarbonate were heated together for 6 hours at 175° C. The reaction mixture was then dissolved in methyl alcohol and the resulting mixture was steam distilled to remove unreacted aniline. The reaction mixture was then filtered and the desired product collected on the filter was dried. Upon recrystallization from ethyl alcohol containing Norite 2-nitro-4-(N-methyl-N-β-hydroxyethylsulfamyl) diphenylamine was obtained as an orange powder which melted at 108° C.–110° C.

*Example 3.—2-nitro-4-(N,N-dimethylsulfamyl)-4'-ethoxydiphenylamine*

5.24 grams of N,N-dimethyl-4-chloro-3-nitrobenzenesulfonamide, 3 grams of p-phenetidine and 1.84 grams of NaHCO₃ were heated together for 5 hours on an oil bath at reflux. The reaction mixture was then cooled to 80° C. and dissolved in acetone, following which it was poured into a dilute aqueous hydrochloric acid solution (5% HCl). The reaction product separated as an oil and was recovered by decantation. Upon crystallization from ethyl alcohol 2-nitro-4-(N,N-dimethylsulfamyl)-4'-ethoxydiphenylamine was recovered as a yellow solid melting at 125° C.–127° C.

*Example 4.—2-nitro-4-(N,N-dimethylsulfamyl)-4'-methyldiphenylamine*

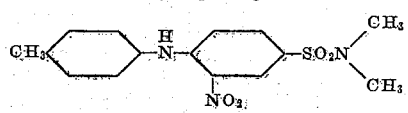

5.28 grams of N,N-dimethyl-4-chloro-3-nitrobenzenesulfonamide, 2.57 grams of p-toluidine and 1.84 grams of sodium bicarbonate were heated for 5 hours at reflux at 140° C.–160° C. The reaction mixture was dissolved in acetone and some acetone was boiled off to effect crystallization of the reaction product. As the desired product proved to be rather soluble in acetone methyl alcohol was added to precipitate any of the 2-nitro-4-(N,N-dimethylsulfamyl)-4'-methyldiphenylamine remaining in solution. It was recovered as red colored crystals melting at 115° C.–117° C.

*Example 5.—2-nitro-4-(N,N-di-β-hydroxyethylsulfamyl) diphenylamine*

This dye is prepared exactly as in Example 1, using 324 grams (1 mole) of N,N-di-β-hydroxyethyl-4-chloro-3-nitrobenzenesulfonamide instead of 264 grams of N,N-dimethyl-4-chloro-3-nitrobenzenesulfonamide.

*Example 6.—2-nitro-4-(N,N-di-β-methoxyethylsulfamyl) diphenylamine*

This compound is prepared exactly as in Example 1, using 352 grams (1 mole) of N,N-di-β-methoxyethyl-4-chloro-3-nitrobenzenesulfonamide instead of 264 grams of N,N-dimethyl-4-chloro-3-nitrobenzenesulfonamide.

*Example 7.—2-nitro-4-[N,N-di-β-(β-hydroxyethoxy)-ethylsulfamyl]diphenylamine*

This compound is prepared exactly as in Example 1, using 412 grams (1 mole) of N,N-di-β-(β-hydroxyethoxy)ethyl-4-chloro-3-nitrobenzenesulfonamide instead of 264 grams of N,N-dimethyl-4-chloro-3-nitrobenzenesulfonamide.

*Example 8.—2-nitro-4-(N,N-di-β-sulfoethylsulfamyl) diphenylamine*

This compound is prepared exactly as in Example 1, using 452 grams (1 mole) of N,N-di-β-sulfoethyl-4-chloro-3-nitrobenzenesulfonamide instead of 264 grams of N,N-dimethyl-4-chloro-3-nitrobenzenesulfonamide.

*Example 9.—2-nitro-4-(N,N-di-β-sulfatoethylsulfamyl) diphenylamine*

This compound is prepared exactly as in Example 1, using 484 grams (1 mole) of N,N-di-β-sulfatoethyl-4-chloro-3-nitrobenzenesulfonamide instead of 264 grams of N,N-dimethyl-4-chloro-3-nitrobenzenesulfonamide.

*Example 10.—2-nitro-4-(N,N-diallylsulfamyl)-2',5'-dimethyldiphenylamine*

This compound is prepared exactly as in Example 1, using 316 grams (1 mole) of N,N-diallyl-4-chloro-3-nitrobenzenesulfonamide instead of 264 grams of N,N-dimethyl-4-chloro-3-nitrobenzenesulfonamide and employing 133.2 grams (1.1 moles) of 2,5-dimethylaniline instead of 102.3 grams of aniline.

*Example 11.—2-nitro-4-(N-methyl-N-β-hydroxysulfamyl)-4'-acetamidodiphenylamine*

5.9 grams of N-methyl-N-β-hydroxyethyl-4-chloro-3-nitrobenzenesulfonamide, 3.6 grams of p-aminoacetanilide and 2 grams of NaHCO₃ were heated together for 6 hours at 175° C. The reaction mixture was then steam distilled to remove unreacted p-aminoacetanilide and then filtered and the 2-nitro-4(N-methyl-N-β-hydroxyethylsulfamyl)-4'-acetaminodiphenylamine recovered on the filter was dried. Upon recrystallization from ethyl alcohol it melted at 125° C.–132° C.

*Example 12.—2-nitro-4-(N,N-dimethylsulfamyl)-diphenylamine*

1000 grams of water and 264 grams of N,N-dimethyl-4-chloro-3-nitrobenzenesulfonamide are placed in a suitable reaction vessel and 93 grams of aniline and 94 grams of NaHCO₃ are added thereto and the reaction mixture is heated to 95° C. over a period of 1 hour and maintained at this temperature for 15 hours. The reaction mixture is then filtered and the 2-nitro-4-(N,N-dimethylsulfamyl)diphenylamine recovered on the filter is washed with water, until free of aniline, and dried. If desired the liquid can be removed from the reaction mixture by decantation, additional water added to the residue, the reaction mixture heated to 95° C.–100° C. with agitation and agitated at 95° C.–100° C. for 10 to 15 minutes and then filtered. The recovered product is then washed well with water until free from aniline. The product so prepared melts at about 130° C.

The example just given illustrates the use of water as a reaction medium for the process of our invention. This method is of general applicability for the preparation of the compounds of the invention and is not restricted to the compound of Example 12.

*Example 13.—Disodium salt of 2-nitro-4-(N,N-di-β-sulfatoethylsulfamyl) diphenylamine*

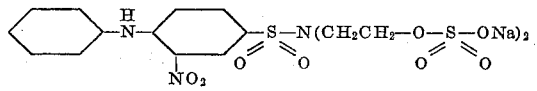

43 grams of 2-nitro-4-(N,N-di-β-hydroxyethylsulfamyl) diphenylamine are dissolved in chloroform and the resulting solution is cooled to 0° C. Then 40 grams of chlorosulfonic acid are added dropwise with vigorous stirring over a period of several hours. Stirring is continued at 0° C. for 6 hours and then the reaction mixture is slowly warmed to 50° C. over a period of 2–4 hours. The chloroform is then removed by distillation under reduced pressure and then the reaction mixture is neutralized by adding aqueous sodium bicarbonate with ice. Following this the reaction mixture is warmed to 75° C. and any sulfated dye is filtered off. Upon cooling, the desired product is recovered by salting out with sodium chloride and filtering. The product thus obtained is washed well with water and dried.

In a manner similar to that illustrated in the foregoing examples, the following additional diphenylamine compounds were prepared.

| Diphenylamine | M. P., °C. |
|---|---|
| 2-nitro-4-(N,N-dimethylsulfamyl)-4'-methoxy- | 117–119 |
| 2-nitro-4-(N,N-dimethylsulfamyl)-2'-methyl- | 168–170 |
| 2-nitro-4-(N-methyl-N-β-hydroxyethylsulfamyl)-4'-methyl- | 115–117 |
| 2-nitro-4-(N-methyl-N-β-hydroxyethylsulfamyl)-2'-methoxy- | 138–140 |
| 2-nitro-4-(N-methyl-N-β-hydroxyethylsulfamyl)-4'-methoxy- | 104–105 |
| 2-nitro-4-(N-methyl-N-β-hydroxyethylsulfamyl)-2'-ethoxy- | 93–96 |
| 2-nitro-4-(N-methyl-N-β-hydroxyethylsulfamyl)-4'-ethoxy- | 98–101 |
| 2-nitro-4-(N-methyl-N-β-hydroxyethylsulfamyl)-4'--β-hydroxyethoxy- | 147–149 |
| 2-nitro-4-(N-methyl-N-β-hydroxyethylsulfamyl)-4'-chloro- | 134–136 |

Similarly the following diphenylamine compounds can be prepared:

Diphenylamine:
2-nitro-4-(N,N-di-n-propylsulfamyl)-
2-nitro-4-(N,N-di-isopropylsulfamyl)-
2-nitro-4-(N,N-di-n-butylsulfamyl)-4'-methyl-
2-nitro-4-(N,N-dimethylsulfamyl)-4'-ethyl-
2-nitro-4-(N,N-(N,N-dimethylsulfamyl)-4'-n-propyl-
2-nitro-4-(N,N-dimethylsulfamyl)-2',4'-dimethyl-
2-nitro-4-(N,N-dimethylsulfamyl)-2',4',5'-trimethyl-
2-nitro-4-(N,N-dimethylsulfamyl)-4'-secondary butyl-
2-nitro-4-(N,N-dimethylsulfamyl)-2',5'-diethoxy-
2-nitro-4-(N,N-dimethylsulfamyl)-4'-β-hydroxyethoxy-
2-nitro-4-(N,N-dimethylsulfamyl)-4'-β,γ-dihydroxypropoxy-
2-nitro-4-(N,N-dimethylsulfamyl)-4'-acetamino-
2-nitro-4-(N,N-dimethylsulfamyl)-4'-hydroxy-
2-nitro-4-(N,N-dimethylsulfamyl)-2'-hydroxy-4'-acetamino-
2-nitro-4-(N,N-dimethylsulfamyl)-4'-chloro-
2-nitro-4-(N,N-dimethylsulfamyl)-2',4',6'-trichloro-
2-nitro-4-(N,N-dimethylsulfamyl)-4'-butyrylamino-
2-nitro-4-(N,N-diethylsulfamyl)-
2-nitro-4-(N,N-diethylsulfamyl)-4'-methoxy-
2-nitro-4-(N,N-diethylsulfamyl)-2',5'-dimethoxy
2-nitro-4-(N,N-diethylsulfamyl)-4'-n-butoxy-
2-nitro-4-(N,N-diethylsulfamyl)-2',4',6'-tribromo-
2-nitro-4-(N-β-hydroxyethyl-N-n-butylsulfamyl)-
2-nitro-4-(N-β-hydroxyethyl-N-n-butylsulfamyl)-4'-ethoxy-
2-nitro-4-(N-methyl-N-β-hydroxypropylsulfamyl)-
2-nitro-4-(N-methyl-N-β-hydroxypropylsulfamyl)-4'-methyl-
2-nitro-4-(N-methyl-N-β-hydroxypropylsulfamyl)-2'-methyl-5'-methoxy-
2-nitro-4-(N-ethyl-N-β,γ-dihydroxypropylsulfamyl)-
2-nitro-4-(N-ethyl-N-β,γ-dihydroxypropylsulfamyl)-2',4',6'-trimethyl-
2-nitro-4-(N-n-propyl-N-β-hydroxyethylsulfamyl)-
2-nitro-4-(N-ethyl-N-β-methoxyethylsulfamyl)-
2-nitro-4-(N-ethyl-N-β-methoxyethylsulfamyl)-2',4'-dihydroxy-
2-nitro-4-(N-methyl-N-β-hydroxyethylsulfamyl)-4'-hydroxy-
2-nitro-4-(N-methyl-N-β-hydroxyethylsulfamyl)-2'-methyl
2-nitro-4-(N-ethyl-N-methyl-β,γ-dihydroxypropylsulfamyl)-
2-nitro-4-(N-ethyl-N-β-sulfoethylsulfamyl)-
2-nitro-4-(N-ethyl-N-β-sulfoethylsulfamyl)-2',5'-dihydroxy-
2-nitro-4-(N-methyl-N-allylsulfamyl)-
2-nitro-4-(N-methyl-N-allylsulfamyl)-2'-ethoxy-4'-acetamino-
2-nitro-4-(N-methyl-N-β-[β-hydroxyethoxy]-ethylsulfamyl)-
2-nitro-4-(N-methyl-N-β-[β-hydroxyethoxy]-ethylsulfamyl)-2'-methoxy-
2-nitro-4-(N-di-β-sulfatoethylsulfamyl)-
2-nitro-4-(N-di-β-sulfatoethylsulfamyl)-4'-n-propoxy- It will be understood that the diphenylamine compounds selected to illustrate our invention are illustrative and not limitative of our invention. The manner of preparation of other diphenylamine compounds within the scope of our invention is obvious from the description given herein.

The 4-chloro-3-nitrobenzene sulfonamide compounds can be prepared by condensing 4-chloro-3-nitrobenzene sulfonyl chloride with secondary amines. To prepare N,N-dimethyl-4-chloro-3-nitrobenzenesulfonamide, one gram mole (256 g.) of 4-chloro-3-nitrobenzene sulfonyl chloride was dissolved in 500 cc. of acetone, and to this solution were added, with stirring, two moles of dimethylamine (30 per cent water solution). The temperature was kept at 10° C. to 20° C. during the entire reaction. One hour after the addition of the dimethylamine was completed, 3 volumes of cold water were added to the reaction mixture. The N,N-dimethyl-4-chloro-3-nitrobenzenesulfonamide which precipitated was filtered off, washed with water and dried in the air. It melted at 99° C.–100° C.

*N-methyl-N-β-hydroxyethyl-4-chloro-3-nitrobenzenesulfonamide*

In a liter flask fitted with a thermometer, stirrer and funnel were added 128 grams of 4-chloro-3-nitrobenzenesulfonyl chloride and 250 cc. of acetone. 41.3 grams of N-methyl-N-β-hydroxyethyl) amine as a 31 percent water solution (134 grams) in 50 cc. of acetone were added over a 2 hour period with stirring. The temperature was kept below 20° C. but little, if any, heat was developed. After the addition of the dimethylamine, an aqueous solution consisting of 22 grams of NaOH and 50 cc. of water were added portionwise, with stirring, over a 2-hour period. Stirring was continued for an hour. The reaction mixture was poured with stirring into 1400 cc. of water and after settling an hour was filtered. The reaction product obtained on the filter was washed well with water and dried. It melted at 104–106° C. A yield of 107 grams was obtained.

In a manner similar to that just illustrated the following 4-chloro-3-nitrobenzenesulfonamide compounds can be prepared.

N,N-diethyl-4-chloro-3-nitrobenzenesulfonamide
N,N-di-n-propyl-4-chloro-3-nitrobenzenesulfonamide
N,N-di-isopropyl-4-chloro-3-nitrobenzenesulfonamide
N,N-di-n-butyl-4-chloro-3-nitrobenzenesulfonamide
N,N-di-β-hydroxyethyl-4-chloro-3-nitrobenzenesulfonamide
N,N-di-β-methoxyethyl-4-chloro-3-nitrobenzenesulfonamide
N,N-di-β-(β-hydroxyethoxy)ethyl-4-chloro-3-nitrobenzenesulfonamide
N,N-diallyl-4-chloro-3-nitrobenzenesulfonamide
N-β-hydroxyethyl-N-n-butyl-4-chloro-3-nitrobenzenesulfonamide
N-methyl-N-β-hydroxypropyl-4-chloro-3-nitrobenzenesulfonamide
N-ethyl-N-β,γ-dihydroxypropyl-4-chloro-3-nitrobenzenesulfonamide
N-n-propyl-N-β-hydroxyethyl-4-chloro-3-nitrobenzenesulfonamide
N-ethyl-N-β-sulfoethyl-4-chloro-3-nitrobenzenesulfonamide
N-methyl-N-allyl-4-chloro-3-nitrobenzenesulfonamide Secondary amines such as (N-methyl-N-β-hydroxypropyl) amine, and (N-β-hydroxyethyl-N-n-propyl) amine, for example, can be prepared by reacting methylamine and n-propylamine with propylene oxide and ethylene oxide, respectively. Similarly, (N-ethyl-N-β,γ-dihydroxypropyl) amine can be prepared by reacting ethylamine with glyceryl chlorohydrin. By the use of other alkylene oxide or chlorohydrin compounds other hydroxyalkyl groups can be introduced. This method of introducing hydroxyalkyl groups is well known to those skilled in the art and it is not believed necessary to discuss it further.

If desired, the hydroxyalkyl group can be introduced last. Thus, 2-nitro-4-(N-methyl-N-β-hydroxypropylsulfamyl) diphenylamine, for example, can be prepared by reacting aniline with N-methyl-4-chloro-3-nitrobenzenesulfonamide and, in turn, reacting the 2-nitro-4-(N-methylsulfamyl)-diphenylamine obtained with propylene oxide. N-methyl-4-chloro-3-nitrobenzenesulfonamide can be obtained by condensing 4-chloro-3-nitrobenzene sulfonyl chloride with methylamine.

4-chloro-3-nitrobenzene sulfonamide was prepared by the method of P. Fischer (Ber. 24, 3190) by condensing 4-chloro-3-nitrobenzene sulfonyl chloride with ammonium carbonate, or better by adding 2.5 moles of dilute ammonium hydroxide to a slurry of one mole of 4-chloro-3-nitrobenzene sulfonyl chloride. The sulfonamide melts at 25° to 35° C. and boils at 175° to 176° C. 4-chloro-3-nitrobenzene sulfonyl chloride was prepared by condensing sodium 4-chloro-3-nitrobenzene sulfonate with phosphorus pentachloride (P. Fischer, Ber. 24, 3190) or by the action of 3 parts by weight of freshly distilled chlorosulfonic acid on one part of the sodium salt of 4-chloro-3-nitrobenzene sulfonic acid at 150° C. for several hours. 4-chloro-3-nitrobenzene sulfonyl chloride melts at 61° to 62° C. uncor. 4-chloro-3-nitrobenzene sulfonic acid was prepared by sulfonating o-chloronitrobenzene with fuming sulfuric acid according to the method of P. Fischer (B 24, 2187).

The new diphenylamine compounds of our invention are primarily of utility for the coloration of textile materials comprising organic derivatives of cellulose. However, they possess some utility for the coloration of non-vegetable textile fibers in general. Thus, they can be used to color organic derivatives of cellulose, silk, wool, nylon, Vinyon and protein synthetic wools. Also cellulose ester and cellulose ether lacquers, as well as lacquers from vinyl compounds can be colored. Those compounds of the invention containing a sulfoalkyl group of a sulfatoalkyl group appear to possess greater utility for the coloration of wool and silk textile materials than they do for organic derivatives of cellulose textile materials although they dye the latter named materials. The coloration produced by the diphenylamine compounds of our invention is yellow.

Typical organic derivatives of cellulose that can be colored include the hydrolyzed, as well as the unhydrolyzed, cellulose carboxylic esters, such as cellulose acetate, cellulose propionate and cellulose butyrate, and the hydrolyzed, as well as the unhydrolyzed mixed cellulose carboxylic esters, such as cellulose acetate propionate and cellulose acetate butyrate, and the cellulose ethers such as methyl cellulose, ethyl cellulose and benzyl cellulose.

The diphenylamine compounds of our invention are, for the most part, relatively insoluble in water and, accordingly, they may be advantageously directly applied to the textile material undergoing coloration in the form of an aqueous suspension which can be prepared by grinding the dye to a paste, in the presence of a sulfonated oil, soap, or other suitable dispersing agent and dispersing the resulting paste in water. In some instances, the compounds may possess sufficient solubility in water to render the use of a dispersing agent unnecessary. Generally speaking, however, the use of a dispersing agent is desirable.

Direct dyeing operations can, with advantage, be conducted at temperatures of about 75° to 85° C., but any suitable temperature may be used. Thus, the textile material to be dyed or colored is ordinarily added to the dye bath at a temperature lower than that at which the main portion of the dyeing is to be effected, a temperature of from 45° to 55° C., for example, following which the temperature is raised to that selected for carrying out the operation. The temperature at which the dyeing operation is carried out will vary somewhat depending upon the particular material undergoing coloration. As is understood by those skilled in the art, the intensity of dyeing can be varied by varying the proportion of dye to the material undergoing coloration. Generally speaking, 1 to 3% by weight of dye to material is employed, although any desired proportions can be used.

Suitable dispersing agents are disclosed in our United States Patent 2,115,030, issued April 26, 1938. The process disclosed in this patent for the dyeing of cellulose acetate can be used in applying the dyes of the present invention to cellulose acetate. While a satisfactory method for dyeing has been disclosed herein, it will be understood that any other suitable methods for dyeing the non-vegetable textile materials named herein can be employed. Lacquers may be colored with the dye compounds of our invention by the methods customarily employed in the lacquer art.

This application is in part a continuation of our copending application, Ser. No. 500,998, filed September 2, 1943, now United States Patent 2,422,029.

We claim:

The dye compound having the formula:

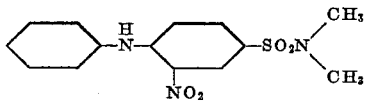

JOSEPH B. DICKEY.
JAMES G. McNALLY.

REFERENCES CITED

The following references are of record in the file of this patent:

UNITED STATES PATENTS

| Number | Name | Date |
| --- | --- | --- |
| 2,080,704 | Fischer et al. | May 18, 1937 |
| 2,422,029 | Dickey et al. | June 10, 1946 |

FOREIGN PATENTS

| Number | Country | Date |
| --- | --- | --- |
| 669,031 | Germany | Dec. 15, 1938 |

OTHER REFERENCES

Fischer, "Ber. Deut. Chem.," vol. 24, (1891), page 3794.

Ullman, "Liebig's Annalen," vol. 366, (1909), page 107.

Northey, "Chem. Reviews," vol. 27, No. 1, August 1940, page 140.

Certificate of Correction

Patent No. 2,466,011. April 5, 1949.

JOSEPH B. DICKEY ET AL.

It is hereby certified that errors appear in the printed specification of the above numbered patent requiring correction as follows:

Column 5, lines 67 and 68, Example 11, for that portion of the title reading "hydroxysulfamyl)-4'-acetamidodiphenylamine" read *hydroxyethylsulfamyl)-4'-acetaminodiphenylamine*; column 6, line 53, Example 13, for the word "sulfated" read *unsulfated*; column 7, under the heading "Diphenylamine" for that portion of the fifth compound reading "(N,N-(N,N-dimethylsulfamyl)" read *(N,N-dimethylsulfamyl)*; column 9, line 33, for the numeral "2187" read *3187*; line 45, same column, for "group of" read *group or*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*